United States Patent [19]
Beatty

[11] Patent Number: 6,094,501
[45] Date of Patent: Jul. 25, 2000

[54] DETERMINING ARTICLE LOCATION AND ORIENTATION USING THREE-DIMENSIONAL X AND Y TEMPLATE EDGE MATRICES

[75] Inventor: David Andrew Beatty, Burnaby, Canada

[73] Assignee: Shell Oil Company, Houston, Tex.

[21] Appl. No.: 09/070,328

[22] Filed: Apr. 30, 1998

Related U.S. Application Data

[60] Provisional application No. 60/045,640, May 5, 1997.

[51] Int. Cl.$^7$ .............................. G06K 9/00; G06T 9/20
[52] U.S. Cl. .................... 382/154; 382/104; 382/199; 382/218; 382/266; 382/291
[58] Field of Search ...................... 382/103–106, 382/151, 154, 173, 199, 205, 209, 217–220, 263, 266, 278, 279, 285, 289, 291, 295, 296; 348/94, 95, 116, 148, 139, 42; 701/300; 345/436–439; 250/559.29, 559.3, 559.37, 559.38; 356/375, 390

[56] References Cited

U.S. PATENT DOCUMENTS

| | | | |
|---|---|---|---|
| 3,527,268 | 9/1970 | Ginsburgh | 141/98 |
| 5,379,353 | 1/1995 | Hasegawa et al. | 382/41 |
| 5,381,155 | 1/1995 | Gerber | 342/104 |
| 5,381,489 | 1/1995 | Bernzott et al. | 382/40 |
| 5,459,636 | 10/1995 | Gee et al. | 364/516 |
| 5,487,116 | 1/1996 | Nakano et al. | 382/104 |
| 5,609,190 | 3/1997 | Anderson et al. | 141/59 |
| 5,628,351 | 5/1997 | Ramsey, Jr. et al. | 141/98 |
| 5,634,503 | 6/1997 | Musil et al. | 141/232 |
| 5,675,661 | 10/1997 | Richmann et al. | 382/104 |
| 5,845,006 | 12/1998 | Sumi et al. | 382/154 |
| 5,887,083 | 3/1999 | Sumi et al. | 382/199 |
| 5,890,808 | 4/1999 | Neff et al. | 382/209 |

FOREIGN PATENT DOCUMENTS

WO 96/39678 12/1996 WIPO .............................. G06K 9/64

OTHER PUBLICATIONS

Yoshikatsu Kimura et al., Stereo Vision System for Car Assembly, May 1995 IEEE International Conference on Robotics and Automation, vol. 2, pp. 1403–1409.

*Primary Examiner*—Leo H. Boudreau
*Assistant Examiner*—Brian P. Werner
*Attorney, Agent, or Firm*—Del S. Christensen

[57] ABSTRACT

A method to identify the location and orientation of an article is provided, the method comprising the steps of: obtaining an image of the article with the article having a known orientation and location relative to a camera; creating a X and Y template edge matrix from the image of the article; creating a plurality of sets of modified template edge matrices, each of the sets of modified template edge matrices being a X and Y template edge matrix with the article in a different orientation; capturing an digital visual image containing the article, the digital image being a matrix of pixels; creating X and Y article edge matrices from the matrix of pixels; quantifying difference between each of the sets of modified template edge matrices and the X and Y article edge matrices with the modified template edge matrices placed at a plurality of locations within the bounds of the article edge matrices; and identifying the location and orientation of the article as the orientation of the article represented by the set of modified template edge matrices at the location within the bounds of the X and Y article edge matrices with the minimal quantified differences between the modified template edge matrices and the X and Y article edge matrices wherein a plurality of images are obtained and three dimensional images are created of the article in both the known and the unknown position. The three dimensional images are used either in the initial matching of the article, or to verify a position and orientation of the article in the article determined from matching two dimensional images.

10 Claims, No Drawings

DETERMINING ARTICLE LOCATION AND ORIENTATION USING THREE-DIMENSIONAL X AND Y TEMPLATE EDGE MATRICES

This application claims the benefit of U.S. Provisional Application No. 60/045,640, filed May 5, 1997, the entire disclosure of which is hereby incorporated by reference.

FIELD OF THE INVENTION

This invention relates to a method for identifying the location and orientation of a known article within a visual field.

BACKGROUND TO THE INVENTION

U.S. Pat. No. 5,379,353 suggests a differential analysis circuit that utilizes a step to identify edge vectors for identification of such things as a road for a mobile robot. A digital image captured from a video camera is processed using an algorithm that includes generation of a differential of brightness along each row of pixels, and presumably also along each column of pixels. The absolute value of the differential brightness represents a change in the picture, and a differential that exceeds a threshold is identified as a possible edge to a road.

U.S. Pat. No. 5,381,155 suggests a speed detection system that identifies moving vehicles in the view of a fixed camera, measures the speed at which the vehicles are moving, and identifies a license plate number from the vehicle. Commercially available systems are disclosed that are said to be capable of identifying the license plate within a captured image and then reads the numbers and letters within the license plate number.

U.S. Pat. No. 5,381,489 suggests a system for recognition of characters on a medium. This system includes making a window of a possible character from the medium, and then comparing that window to each template within a set. The entire set of templates must be screened each time a character is identified. The templates are generated based on previously recognized characters from the document where the initial recognition requires a more rigorous comparison to different character features.

A problem faced in visual recognition is to recognize the location, within the view of a camera, and the orientation, of a particular article where the article may be one of a relatively few possible articles already identified from a library of potential articles. The possibility of a variety of lighting conditions and shadows make such recognition difficult. There are also typically constraints on the amount of computer data storage available at the site of a desired visual recognition facility. Therefore, templates of different orientations an scales of the different articles can generally not be generated and stored initially.

Such a problem in visual recognition is encountered when visual recognition is used as a means to identify vehicles or determine the orientation of vehicles in an automated refuelling system. For example, in U.S. Pat. No. 3,527,268 it is suggested that vehicle identification in an automated refuelling system can be achieved in a fully automated method by a photo-electric means to detect the silhouette of the automobile. How this is to be done is not suggested.

It is therefore an object of the present invention to provide a method to identifying the location and orientation of an article, wherein the method is capable of identifying the location and orientation of the article in a variety of natural and artificial lighting conditions, and wherein a large number of templates do not have to be digitally stored.

SUMMARY OF THE INVENTION

These and other objects of the invention are accomplished by a method to identify the location and orientation of an article, the method comprising the steps of: obtaining an image of the article with the article having a known orientation and location relative to a camera; creating a X and Y template edge matrix from the image of the article; creating a plurality of sets of modified template edge matrices, each of the sets of modified template edge matrices being a X and Y template edge matrix with the article in a different orientation; capturing an digital visual image containing the article, the digital image being a matrix of pixels; creating X and Y article edge matrices from the matrix of pixels; quantifying difference between each of the sets of modified template edge matrices and the X and Y article edge matrices with the modified template edge matrices placed at a plurality of locations within the bounds of the article edge matrices; and identifying the location and orientation of the article as the orientation of the article represented by the set of modified template edge matrices at the location within the bounds of the X and Y article edge matrices with the minimal quantified differences between the modified template edge matrices and the X and Y article edge matrices wherein a plurality of images are obtained and three dimensional images are created of the article in both the known and the unknown position. The three dimensional images are used either in the initial matching of the article, or to verify a position and orientation of the article in the article determined from matching two dimensional images.

This method can be readily adapted to identification of a location and orientation of a vehicle within a bay for automated refuelling purposes. The make and model of the vehicle can be identified by another means, such as for example, driver manual input, a magnetic or optical strip, or a passive or active transponder located on the vehicle. With the make and model identified, or limited to one of a small number of possibilities (such as when more than one transponder signal is being received), base templates can be retrieved from storage. The base templates can be prepared from a digital visual image of the known make and model of vehicle with the vehicle positioned at a known location with respect to the camera, and the image processed by generation of X and Y edge matrices. After the make and model of the vehicle are identified, a series of modified templates are created from the retrieved templates by rotation of the template edge matrices to different angles from the initial orientation and/or scaling the matrices to represent different distances from the camera. Thus, only one set of base templates (or one set of X and Y edge matrix templates) needs to be stored in the data base for each vehicle. A captured visual image containing the vehicle within the refuelling facility can then be processed to generate article edge matrices, and compared to the modified templates, with each modified template being compared to the article edge matrices at different locations within the article edge matrices.

Preferably, a mask of the template is prepared so that only the outlines and/or internal edges of the article, and not the surrounding area, is compared to the actual article edge matrices. The mask also provides expected dimensions of the article so that only locations within the article edge matrices within which the article would fit would be searched for the article, and the article can be identified with a position relatively close to the edge of the view.

Separately comparing the X and Y edge template matrices with the article X and Y edge matrices significantly improves the robustness of the method, and results in reliable fits being found quickly in a variety of light conditions, with partial obstruction of the view of the article, and with partial masking by dirt, leaves, grass, and other articles that may be present in a relatively uncontrolled environment.

DETAILED DESCRIPTION OF THE INVENTION

A camera is typically used in the practice of the present invention to capture a visual image of an article in a known position and orientation. A digital image can be captured using one of the commercially available framegrabber hardware and associated software packages. The digital image is a matrix of pixels, each of the pixels having a number that corresponds linearly to a brightness. A color image can be utilized, in which case the image is represented by three matrices, one each for red, green and blue. Typically, the images of about 256 by 240 pixels are preferred for the practice of the present invention because such a number of pixels results in sufficient resolution and is within the capacity of relatively inexpensive video cameras. The video camera may generate an image of about twice the resolution of a 256 by 240 matrix, in which case the image can be reduced by averaging adjacent pixels to create a matrix of pixels having one half the height and one half the width by averaging blocks of four pixels.

Signal to noise ratios can be increased by averaging two or more consecutive images.

Edge matrices may be generated from both the images containing the article in a known location and orientation relative to the camera, and the images containing the article within which the location and orientation of the articles are to be determined, by applying operators such as the following:

$$\frac{1}{8}\begin{bmatrix} 1 & 2 & 1 \\ 0 & 0 & 0 \\ -1 & -2 & -1 \end{bmatrix}$$

and;

$$\frac{1}{8}\begin{bmatrix} 1 & 0 & -1 \\ 2 & 0 & -2 \\ 1 & 0 & -1 \end{bmatrix}$$

A more preferred edge operator utilizes a convolution kernel which favors long edges, such as, for the horizontal edge matrix, an operator which selects minimum between:

$$\frac{1}{256}\begin{bmatrix} 1 & 0 & -1 \\ 2 & 0 & -2 \\ 1 & 0 & -1 \end{bmatrix} \otimes \begin{bmatrix} 0 & 1 & 0 \\ 0 & 2 & 0 \\ 0 & 1 & 0 \end{bmatrix}^4$$

and $$\frac{1}{2}\begin{bmatrix} 1 & 0 & -1 \\ 2 & 0 & -2 \\ 1 & 0 & -1 \end{bmatrix}$$

and vertical edge matrices as the minimum of: and $$\frac{1}{256}\begin{bmatrix} 1 & 2 & 1 \\ 0 & 0 & 0 \\ -1 & -2 & -1 \end{bmatrix} \otimes \begin{bmatrix} 0 & 0 & 0 \\ 1 & 2 & 1 \\ 0 & 0 & 0 \end{bmatrix}^4$$

$$\frac{1}{8}\begin{bmatrix} 1 & 2 & 1 \\ 0 & 0 & 0 \\ -1 & -2 & -1 \end{bmatrix}$$

As can be seen from these operators, they each result in a matrix in which the elements will sum to zero. The absolute values of the elements of the resulting matrices indicate the change in brightness along the x and y axis respectively. The use of edge magnitudes helps make the appearance invariant to direction of light and color of the object. Producing these edge matrices therefore results in images that can be compared with templates inspite of significant differences in lighting or color of the article (although color could be identified as well in the practice of the present invention). The results of these two operators can be summed to obtain one edge vector matrix, but in the practice of the present invention, it is significant that the two are not combined for comparison. Not combining the two greatly increases the robustness of the algorithm, i.e. the ability of the algorithm to identify outlines when the articles are masked with dirt, partially obscured, or subjected to varying light conditions.

A mask is preferably place over the image of the edge matrices of the article with the know location and orientation so that only the known outlines of the article are considered. The masked regions can be referred to as "don't care" regions, because edge data in these regions will be ignored when fitting the edge matrices of the article in the known position to the edge matrices of the article within which the location and orientation of the article is to be identified.

The dimensions of the mask can also define limits of the locations within the image containing the article that could contain an image of the article. For example, if the mask were fifty pixels by fifty pixels within an image of 256 pixels by 240 pixels, then only locations within the middle 206 by 190 pixels could be the center of the mask, if the entire article is within the image.

When a color image is used, edge matrices are preferably generated for each color, and then the three edge matrices are preferably combined to form one X or Y edge matrix. This combination can be by summing the absolute values of the three edge matrices (and dividing the sum by three), by selecting the maximum value of the edge matrix among the three, by calculating an average, or by taking the square root of the sum of the squares of corresponding elements of the edge matrices. It may also be possible to consider two of the three colors in, for example, one of the preceding ways. The use of a color image improves the fit to a template by providing that more edge information is extracted from an image. For example, an edge image at an interface between colors can be identified even if the interface is between surfaces having similar brightness. Use of color images increases the cost of the camera, and the increases amount of data processing required to take advantage of having three sets of images, but is preferred if the difficulty of the application warrants the additional expense.

Reliability of the present method can be improved by utilization of stereo imaging. Stereo imaging according to the present invention involves either use of multiple cameras, or repositioning of the camera to capture images from a multiple of perspectives. Three cameras in an "L" configuration is convenient for capturing of images for stereo imaging. Stereo imaging works by matching small regions in both images and triangulating the depth to that region based on the disparity, or difference in directions, between the region match positions in the two images.

If the region being compared has little or no texture in the direction of the baseline between the two cameras whose images are being compared, then it can easily match the other image in a number of places, only one of which is the correct match. Use of only two cameras is therefore not preferred. Because not all of the image has texture in the appropriate direction, depth maps made for the whole image are sparse, or incomplete. By using two baselines a less sparse depth map results than would be otherwise obtained. Use of three cameras, or images from three positions, is therefore preferred. Even use of three images results in a relatively sparse map, but one that is suitable for the purpose of the present invention.

In practice of the present invention, stereo images can be utilized by deletion from the image to be searched of any edges that are near ground level. Shadows on the ground and mud puddles are thereby eliminated, and false matches are therefore reduced.

In one embodiment of the present invention, stereo imaging can be used after a match between two dimensional images and the template has been obtained, the stereo imaging being used to verify that the final match also matches a three dimensional image of the object. This verification by stereo imaging has two advantages. First, there is an additional check to ensure that a false match is not obtained. Second, the level of match required on the initial search can be lowered because the verification will prevent a false match. Thus, reliability of the final fit can be increased along with the chance of finding a fit being increased.

For a number of pixel disparities, for example from 0 to 10, a squared disparity image, S, can be created by:

$$S_{x,y} = (C_{x,y} - X_{x-d,y})^2$$

where C is the center image, X is the image displaced by d pixels. S can then be filtered with the following kernel:

$$\begin{bmatrix} 1 & 1 & 1 \\ 1 & 1 & 1 \\ 1 & 1 & 1 \end{bmatrix}^2 \otimes \begin{bmatrix} 0 & 1 & 0 \\ 0 & 2 & 0 \\ 0 & 1 & 0 \end{bmatrix}^2$$

to yield F. A disparity map, D can then be created by finding, for each pixel, which disparity has an F image with the lowest value at that pixel. The value of D at that pixel is then assigned the disparity number.

The following kernel can then be applied to the C image to yield a validation map, V:

$$\begin{bmatrix} 1 & 0 & -1 \\ 2 & 0 & -2 \\ 1 & 0 & 1 \end{bmatrix} \otimes \begin{bmatrix} 1 & 1 & 1 \\ 1 & 1 & 1 \\ 1 & 1 & 1 \end{bmatrix} \otimes \begin{bmatrix} 0 & 1 & 0 \\ 0 & 2 & 0 \\ 0 & 1 & 0 \end{bmatrix}^2$$

This validation map, V, can be thresholded based on a configurable parameter and used as a validation mask for the disparity map, D, to yield a partial depth map.

An image obtained from a Y displaced position may also be considered by the same method as the X displaced camera described above, with the X and Y axes reversed in all of the convolution kernels described above. Now for each pixel in the final depth map, the disparity value is determined by which validation map has the highest value. If the X validation map has the highest value, then the X disparity map value is used for that pixel. If neither validation map values are above a texture threshold, then the final depth map is assigned the value 0, indication that depth information is not available at that pixel.

When it is desired to use one stereo imaging to validate the position of an object after a two dimensional match with a template has been obtained, validation can be achieved by predicting, based on the known object shape, what the image from the displaced position would be, and than that image compared to an image obtained from the displaced position. It is preferred that four quadrants are separately correlated because of differences in predicted positions due to, for example, different distances between the target planes for each edge (due to parallax disparity). This correlation may be performed using a normalized correlation of the unprocessed images, say X and X' by:

$$\rho(x,y) = \frac{\sum_{ij} X_{ij} X_{(x+i)(y+j)}}{\sqrt{\sum_{ij} X_{ij} X_{ij}} \sqrt{\sum_{ij} X'_{(x+i)(y+j)} X'_{(x+i)(y+j)}}}$$

Based on this geometric mean of the correlation from each of the valid quadrants, a final match can be validated or rejected.

The image of the article may be reduced by, for example averaging adjacent pixels. An image is therefore created that contains fewer pixels for comparison of the modified templates to the article edge matrices for finding an initial position and orientation estimate. For example, a matrix of 256 by 240 pixels could be reduced to a matrix of 64 by 60 pixels by two successive averaging and subsampling operations. Comparisons of the reduced matrices can be accomplished much more quickly, and then the fit of the reduced matrices can be used as a starting point for finding a fit for the larger matrices. Generally, only locations within a few (one to three) pixels of the pixels averaged into the best fit result of the reduced matrix need to be compared at higher levels of resolution.

Reducing the matrices can significantly reduce computing time required to compare the template edge matrices with the article edge matrices. Two reductions, each being two for one linear reductions, are recommended. Thus, each reduction therefore reduces the amount of information to be considered by a factor of four. The combined reductions reduce the amount of information by a factor of sixteen. Further, each of the parameters for which templates are prepared are of lower resolution, resulting in fewer sets of rotated templates, and at fewer locations within the view of the article edge matrix. Initial searches within the reduced matrixes can therefore be performed in two or three orders of magnitude less time than if the article edge matrix was searched at the original level.

When the article which the image is to be searched for is known, a template of that article, preferably as two edge matrices with a mask, can be selected from a data base. The template can then be modified to represent the article in a plurality of orientations. By orientations, it is meant that the two dimensional image of the article is rotated about the axis of the view of the camera, rotated to an angled view of the object, and/or scaled to represent changes in distance from the camera. Increments of, for example, two to three degrees of rotation can be used to obtain a sufficient number of orientations that one should have a clearly best fit for the article in an particular orientation.

For an application such as an overhead camera identifying a vehicle's position within a bay of an automated refuelling system, an expected orientation can be predicted (most drivers drive in relatively straight), and it can be also predicted that the actual orientation will not be more than a certain variation (for example, plus or minus twenty degrees) from the expected orientation. Thus, only a limited number of modified template edge matrices need to be created. But creating these modified templates after the vehicle make and model have been identified considerably reduces the amount of computer storage needed to store template matrices.

Rotation of the template matrices about an axis essentially normal to a plane of the two dimensional view of the video camera (or "transforming" the image to the new orientation) is readily accomplished by well known methods. Such transformations are preferably performed by calculating the point within the original matrix of pixels each pixel within the transformed matrix would lie so that the four pixels of the original matrix surrounding the center of the pixel from the transformed matrix can be used to interpolate a value for the pixel of the transformed matrix. Again, methods to accomplish these interpolations are well known.

The templates could also be created with the image scaled to represent the article located at different distances from the camera. This scaling is accomplished by changing the dimensions from a center point of the camera view inversely proportional with the distance from the camera. This scaling is preferably performed based on distances from an effective pinhole, where the effective pinhole is defined as a point through which a perspective projection is made by the camera. This effective pinhole would therefore be slightly behind the lens of the camera.

A more difficult problem is to identify a location and orientation of a known article or outline when viewed at an angle significantly different from normal to a plane containing the article or outline. For example, a camera located on a refuelling apparatus may need to locate a gasoline nozzle cover lid from an position that does not allow viewing of the cover lid with the camera facing perpendicular to the plane of the cover lid. A rectangular lid cover would therefore not appear to the camera to be rectangular. The distortion from a rectangular shape would depend upon both the angle and the relative position of the lid with respect to the centerline of the camera's view (known as the optical axis).

Geometric distortion can be eliminated from images that are not normal to the optical axis if the article of the image can be approximated by a planar image. If the angle of the optical axis from perpendicular of the planar image of the article is known (i.e., the image to be searched for the article), geometric distortion can be removed, and images obtained that represent a transformation to perpendicular views of the article in the image to be searched. Likewise, if the templates are created wherein the optical axis is not perpendicular to the plane of the template, geometric distortion can be removed from the templates by such a transformation. If the angle from normal to the optical axis is not known for the image to be searched, this angle can be another search parameter.

Such transformation to a perpendicular view is simplified by the fact that the transformation is the same for a given angle between the optical axis and the normal of the plane approximately containing the article, regardless of the displacement between the camera and the plane, provided that the target remains in the limits of the view of the camera.

The preferred transformation method in the practice of the present invention, rather than to place a pixel from an article image matrix within a transformed image, will take a pixel location from the transformed matrix and calculate the location of that pixel within the article image matrix. An interpolation is then performed using four pixel values of the article image matrix surrounding the position of the inversely transformed matrix pixel to determine the value of the pixel in the transformed image. The following equations provide the location of a pixel from the transformed image on the article image, for the case of the article plane normal being perpendicular to the image X axis:

$$\rho_x = \frac{\sigma_x\left(\frac{P'_o}{P_o}\right)}{b + a\left(\frac{P_{zc}}{P_o}\right) - a\left(\frac{P'_o}{P_o}\right)\sigma_y} \quad (10)$$

and:

$$\rho_y = \frac{a - b\left(\frac{P_{zc}}{P_o}\right) + b\left(\frac{P'_o}{P_o}\right)\sigma_y}{b + a\left(\frac{P_{zc}}{P_o}\right) - a\left(\frac{P'_o}{P_o}\right)\sigma_y} \quad (11)$$

where:

$$a = \sin(\theta) \quad (12)$$

and:

$$b = \cos(\theta) \quad (13)$$

and: $\rho_x$ is the ratio of actual article image plane x position to $P_o$, $\rho_y$ is the ratio of actual article image plane y position to $P_o$, $P_o$ is the perpendicular distance from the effective pinhole to the actual article, $P_o'$ is the distance from the plane of the transformed image to the effective pinhole, $P_{zc}$ is the vertical displacement of the camera of the transformed image relative to the camera position in the actual image, $\sigma_y$ is the y coordinate value in the transformed image, $\sigma_x$ is the w coordinate value in the transformed image, and $\theta$ is the downward pitch angle of the plane normal to the camera.

For $\theta$ of up to about fifty degrees, the following ratios can be used to fit a good portion of the original image into the transformed image:

$$\left(\frac{P'_o}{P_o}\right) = [(b + a\rho_{yl})(b - a\rho_{yl})]^{-1} \quad (14)$$

and $$\left(\frac{P_{zc}}{P_o}\right) = \frac{ab(1 + \rho_{yl}^2)}{(b + a\rho_{yl})(b - a\rho_{yl})} \quad (15)$$

where $\rho_{yl}$ is half of the vertical height of the original image.

Although modified templates can be created with rotations and changes in distances from the camera, a plurality of such rotations and changes could result in an exceedingly large number of modified templates. It is therefore preferred that searches are carried out over one variable out of the possible rotating, scaling, and angled views in the practice of the present invention.

If the orientation of the article with respect to rotation within a plane perpendicular to the camera view is expected to be within about twenty degrees of the orientation of the article having the known orientation, the template X and Y edge images may be simply individually rotated to form the modified edge template images prior to comparing the modified template edge images to the article edge images. When more than about twenty degrees of rotation is possible, a new set of edge images is preferably created based on a combination of the original edge images. The X and the Y edge image values together represent an edge vector having an angle ($\arctan(Y/X)$) and a magnitude ($(X^2+Y^2)^{1/2}$). This angle may be rotated by the angle of rotation of the template and new X and Y components calculated. Typically, only the absolute values of the X and Y components are stored, and therefore edge vectors in the first or third quadrant must be differentiated from edge vectors of the second or fourth quadrant. Edge vectors in the third and fourth quadrants could be considered as their negative vectors in the first and second quadrants respectively, and therefore just two quadrants of vectors need be identified. Quadrants of edge vectors can be identified with a single additional binary template generated from the original template image, the binary template having pixels representing whether the edge magnitude vector at that point represents an edge whose direction vector is in the first or third quadrant, or the second or fourth quadrant. This template can be automatically generated from the template image. This requires very little additional storage space, and can be used during a rotation operation to adjust the X and Y edge magnitude weights to their exact proper proportion at very little extra computational cost. Rotation of the edge matrices by any amount of rotation can thereby be made completely valid.

The following equation is convenient for the purpose of quantifying the differences between the modified template edge matrices and the article edge matrices because commercially available image processing cards are available to quickly generate the comparisons:

$$\rho(x, y) = \frac{\sum_{ij} X_{ij} X'_{(x+i)(y+j)} + \sum_{ij} Y_{ij} Y'_{(x+i)(y+j)}}{\sqrt{\sum_{ij}(X_{ij})^2 + \sum_{ij}(Y_{ij})^2}\sqrt{\sum_{ij}(X'_{(x+i)(y+j)})^2 + \sum_{ij}(Y'_{(x+i)(y+j)})^2}} \quad (16)$$

where X is a X template edge matrix of i by j pixels rotated to an orientation to be tested against a portion of the image matrix, Y is a Y template edge matrix of i by j pixels rotated to an orientation to be tested against a portion of the image matrix, X' is a portion of an image X edge matrix of i by j pixels located at a position of coordinates x,y on the X image edge vector matrix, Y' is a portion of an image Y edge matrix of i by j pixels located at a position of coordinates x,y on the Y image edge vector matrix, and $\rho(x,y)$ is a grey scale edge correlation normalized for point (x,y).

The grey scale edge correlation will be a number between zero and one, with one being a perfect match. Grey scale correlations are performed for each x and y within the article edge matrix for which the entire modified template edge matrix can fit within the article edge matrix. The resulting grey scale correlation that is the closest to approach unity is the closest fit. Interpolation between variables can be achieved using linear or squared weighing above a noise threshold. Such variables may be, for example, angle of rotation, or x and y locations.

Portions of the calculations to generate these grey scale edge matrices can be quickly made using a GPB-1 auxiliary card-AlignCard. "Don't care" regions may also fall within the boundaries of the i by j dimensioned matrices of the modified template edge matrix. Pixels in the template identified as "don't care" are preferably not used in the summations of the terms of Equation 9.

Because the grey scale edge matrix correlation result is very sensitive to relative displacement of an object's template and test image, a smoothing operation may be performed prior to comparison of the two. Although reducing the matrices as described above has a smoothing effect, a further smoothing operation may also be included. This smoothing operation may be performed on each before the correlation is calculated, but after the subsampling to a current search level. A preferred smoothing operation is a Gaussian approximation, given by the following convolution kernel:

$$\frac{1}{8}\begin{bmatrix} 0 & 1 & 0 \\ 1 & 4 & 1 \\ 0 & 1 & 0 \end{bmatrix} \quad (17)$$

When this smoothing is applied, it is preferably applied to both the article edge matrix and the modified template edge matrix.

A preferred application of the method of the present invention is an automated refuelling methods disclosed in U.S. patent application Ser. Nos. 08/461,276, 08/461,280, and 08/461,281, all filed on Jun. 5, 1995, now Pat. Nos. 5,634,503, 5,628,351, and 5,609,190 respectively, the disclosures of which are incorporated herein by reference.

The embodiments described above are exemplary, and reference is made to the following claims to determine the scope of the present invention.

I claim:

1. A method to identify the location and orientation of an article, the article placed on a surface, the method comprising the steps of:

obtaining an plurality of images of the article with the article having a known orientation and location relative to a camera with the plurality of images representing views from a plurality of positions;

creating X and Y template edge matrices from each of the images of the article;

creating a three dimensional X edge matrix from the plurality of X template edge matrices;

creating a three dimensional Y edge matrix from the plurality of Y template edge matrices;

creating a plurality of sets of modified three dimensional template edge matrices, each of the sets of modified three dimensional template edge matrices being a three dimensional X or Y template edge matrix with the article in a different orientation;

obtaining an plurality of images of the article with the article having a unknown orientation or location relative to a camera with the plurality of images representing views from a plurality of positions;

creating X and Y edge matrices from each of the images of the article in an unknown orientation and location;

creating a three dimensional X edge matrix from the plurality of X edge matrices with the article in an unknown orientation and location;

creating a three dimensional Y edge matrix from the plurality of Y edge matrices with the article in an unknown orientation and location;

quantifying difference between each of the sets of modified three dimensional template edge matrices and the three dimensional X and Y edge matrices of the article in an unknown orientation and location with the modified three dimensional template edge matrices placed at a plurality of locations within the bounds of the three dimensional edge matrices of the article in an unknown orientation and location; and identifying the location and orientation of the article as the location and orientation of the article represented by the set of modified three dimensional template edge matrices with the minimal quantified differences between the modified three dimensional template edge matrices and the three dimensional X and Y edge matrices of the article in an unknown orientation and location.

2. The method of claim 1 wherein, prior to quantifying difference between the modified three dimensional X and Y template edge matrices and the three dimensional X and Y edge matrices with the article in an unknown orientation and position, portions of the three dimensional X and Y article edge matrices that are at the surface are deleted.

3. The method of claim 1 wherein three images of the article in the known and in the unknown portions and orientation are captured.

4. The method of claim 1 further comprising the steps of smoothing the modified template edge matrices and the three dimensional X and Y edge matrices by averaging adjacent pixels and subsampling to obtain reduced matrices with a reduced number of pixels;

quantifying the difference between each of the reduced modified template edge matrices and the reduced article edge matrices with the reduced modified template edge matrices placed at a plurality of locations within the bounds of the article edge matrices; and quantifying the difference between each of the sets of modified template edge matrices and the three dimensional X and Y edge matrices with the modified template edge matrices placed at a plurality of locations only for locations near the location and the orientation having minimum differences between the reduced matrices.

5. The method of claim 1 wherein the edge matrices are obtained by applying to the image to obtain horizontal and vertical edge matrices respectively the operators:

$$\frac{1}{8}\begin{bmatrix} 1 & 2 & 1 \\ 0 & 0 & 0 \\ -1 & -2 & -1 \end{bmatrix}$$

and;

$$\frac{1}{8}\begin{bmatrix} 1 & 0 & -1 \\ 2 & 0 & -2 \\ 1 & 0 & -1 \end{bmatrix}$$

6. The method of claim 1 wherein a plurality of modified three dimensional template edge matrices are created with the template edge matrices transformed to represent different angles from normal to the optical axis.

7. The method of claim 1 wherein portions of the modified three dimensional template edge matrices outside of outlines of the article are ignored when quantifying the difference between each of the modified template edge matrices and the article edge matrices.

8. The method of claim 1 wherein the plurality of locations is every contiguous set of pixels within the three dimensional edge matrices within which a modified three dimensional template edge matrices will fit.

9. The method of claim 4 wherein the plurality of locations for which the difference between each of the reduced modified three dimensional template edge matrices and the reduced three dimensional edge matrices are quantified include every contiguous set of pixels within the reduced modified template edge matrices will fit.

10. The method of claim 1 wherein the edge matrices are obtained by applying to the image to obtain horizontal edge matrices by the minimum of:

$$\frac{1}{256}\begin{bmatrix} 1 & 0 & -1 \\ 2 & 0 & -2 \\ 1 & 0 & -1 \end{bmatrix} \otimes \begin{bmatrix} 0 & 1 & 0 \\ 0 & 2 & 0 \\ 0 & 1 & 0 \end{bmatrix}^4$$

and $$\frac{1}{8}\begin{bmatrix} 1 & 0 & -1 \\ 2 & 0 & -2 \\ 1 & 0 & -1 \end{bmatrix}$$

and vertical edge matrices by the minimum of:

$$\frac{1}{256}\begin{bmatrix} 1 & 2 & 1 \\ 0 & 0 & 0 \\ -1 & -2 & -1 \end{bmatrix} \otimes \begin{bmatrix} 0 & 0 & 0 \\ 1 & 2 & 1 \\ 0 & 0 & 0 \end{bmatrix}^4$$

and $$\frac{1}{8}\begin{bmatrix} 1 & 2 & 1 \\ 0 & 0 & 0 \\ -1 & -2 & -1 \end{bmatrix}$$

* * * * *